US005632034A

United States Patent [19]

O'Farrell

[11] Patent Number: 5,632,034

[45] Date of Patent: May 20, 1997

[54] CONTROLLING METHOD INVOCATION SEQUENCE THROUGH VIRTUAL FUNCTIONS IN AN OBJECT-ORIENTED CLASS LIBRARY

[75] Inventor: William G. O'Farrell, Don Mills, Canada

[73] Assignee: International Business Machines Corporation, Armonk, N.Y.

[21] Appl. No.: 674,266

[22] Filed: Jul. 2, 1996

Related U.S. Application Data

[63] Continuation-in-part of Ser. No. 239,192, May 6, 1994, abandoned.

[30] Foreign Application Priority Data

Jun. 1, 1993 [CA] Canada ................................. 2097541

[51] Int. Cl.[6] .................................................. G06F 9/45
[52] U.S. Cl. ................................... 395/701; 395/614
[58] Field of Search ................................... 395/650, 700

[56] References Cited

U.S. PATENT DOCUMENTS

| | | | |
|---|---|---|---|
| 5,093,914 | 3/1992 | Coplien et al. | 395/700 |
| 5,297,284 | 3/1994 | Jones et al. | 395/700 |
| 5,355,496 | 10/1994 | Fant et al. | 395/700 |
| 5,404,525 | 4/1995 | Endicott et al. | 395/700 |
| 5,421,016 | 5/1995 | Conner et al. | 395/700 |
| 5,515,536 | 5/1996 | Corbett et al. | 395/700 |

*Primary Examiner*—Parshotam S. Lall
*Assistant Examiner*—Viet Vu
*Attorney, Agent, or Firm*—Edward Duffield; Andrew J. Dillon

[57] ABSTRACT

A mechanism for controlling method invocation and avoiding problems such as premature method execution before object construction and premature object destruction before method completion, is provided through a protocol function table in a class library. For any virtual functions declared in a class library, the thread of control invoking the function is re-directed through the protocol function table where it is either selectively accepted or delayed for later acceptance pending completion of some related procedure. When used in conjunction with an automatic routine for locating the originating point in an operating program, the protocol function table is particularly useful for executing concurrency in object-oriented applications.

4 Claims, 5 Drawing Sheets

CONTROLLING METHOD INVOCATION SEQUENCE THROUGH VIRTUAL FUNCTIONS IN AN OBJECT-ORIENTED CLASS LIBRARY

This is a continuation-in-part of application Ser. No. 08/239,192, filed 6 May 1994, now abandoned.

BACKGROUND OF THE INVENTION

1. Technical Field

The present invention is directed to the creation and use of a secondary protocol function table in connection with object construction through a class library to control object invocation and destruction in object-oriented technology, and in particular to correctly implement concurrent processing actions in an object-oriented computing environment.

2. Description of the Related Art

Object oriented technology is a relatively recent development, and there are a number of language approaches that utilize the object-oriented concepts described below, including totally new languages developed to embrace the object-oriented approach such as Simula[1] and SmallTalk[2], and extensions to pre-existing traditional languages, such as C++[3].

[1] Simula was the first object-oriented language developed in the late 1960's at the Norwegian Computer Center.
[2] SmallTalk was developed in the early 1970's at the Xerox PARC (Palo Alto Research Center).
[3] C++ was developed in the early 1980's at AT&T's Bell Laboratories as an object-oriented extension to the non-object-oriented C programming language.

C++ can be processed as a directly compiled language or implemented as a preprocessor to C, a rapid processing language that is currently very popular. Accordingly, C++ is very portable to any system with either a C++ or C compiler. As a result, C++ has become one of the most widely used object-oriented models today.

In object-oriented technology, computer simulated "objects", modelled on real world objects, are defined and maintained as self-contained units, independent of each other. The definition of an object includes its "methods" or member functions (what procedures or operations the object is capable of performing) and its "variables" (its attributes, the values of which can change over time). However, the manner in which these internal values are implemented in an object is not visible outside the object.

The methods and attributes defined for a particular object are determined by a "class", a template that defines the methods and variables to be included in a particular type of object. Moreover, the approach to object creation is hierarchical, and classes are defined in terms of higher classes in the hierarchy, that is, the characteristics (methods and/or variables) of a subordinate or subclass are "inherited" from a superior, more generalized base or superclass, and those inherited characteristics form the parameters for the object's methods or variables.

In many computer systems, storage mechanisms known as "class libraries" serve as repositories for the class hierarchy and data, and when an object is called through a processor, the appropriate data is channeled from the class library to hardware-recognized areas of dynamic memory storage known as the heap and the stack.

Because of the invisibility of an object's internal structure, it is not possible to determine, externally, the particular inheritance path of any of the object's methods or attributes, and when one object calls for method implementation of another object, it must do so through method invocation, that is, calling on the other object to perform its method.

In object-oriented technology, objects actually interact by sending and receiving messages. A message is a signal from one object to another that requests the receiving object to carry out one of its methods. The message consists of the name of the receiving object and its arguments, that is, the method it is to carry out and any parameters the method may require to fulfill its charge.

Method invocation is fundamental to object-oriented technology, and is attractive from the point of view of optimizing compile time, since an operating program need only contain a single invocation call, and this call will implement the mechanism to perform the method called outside of the operating program.

However, one limitation on the use of method invocation in compiled languages such as C++ arises from the fact that C++ is an inherently sequential language without any provision for accommodating non-sequential method invocation, such as the concurrent processing of independent applications or threads of control in a single application.

Problems that can arise through non-sequential method invocation in C++ include premature method invocation before the object has been completely constructed, and premature object destruction before the object's method has been completely executed.

Approaches to providing concurrency in object-oriented languages such as C++ have been through the addition of enhancements to C compilers, including compilers for C language extensions. In U.S. Pat. No. 5,179,702—Spix et al., an "optimizer" placed between the front and back ends of the compiler functions to analyze a program and optimize its processing through several means, including "multithreading" (concurrently applying multiple processors to a single program). The optimizer generates machine independent code to establish the environment, including the dynamic allocation of a set of global registers for use by the shared processing group.

A second approach to addressing this problem has been to extend the C++ language to introduce the ability to create concurrent structures in memory in order to accommodate synchronous thread processing. For example, the μC++ language extension[4] consists of a set of programming language constructs needed to express concurrency.

[4] P. A. Buhr, et al., "μC++: Concurrency in the Object-Oriented Language C++", Software Practice and Experience, 22(2), February 1992.

Another approach to providing concurrency believed to have better portability than either language extensions or enhanced compilers is through the incorporation of a mechanism permitting the control of method invocation in a class library associated with the C++ programming language. C++ permits the inclusion of abstract or virtual classes, which are classes with no instances created only for the purpose of organizing a class hierarchy or defining methods and variables that will apply to lower level classes. The abstract or virtual class created (often called a "task class") creates the constructors for concurrent processing.

There are several examples of this in the prior art, one of which is PRESTO[5]. PRESTO is in fact an entire class library for the creation and management of threads, with separate classes for each concurrency.

[5] B. N. Bershad, et al., "PRESTO: A System for Object-Oriented Parallel Programming", Software Practice and Experience, 18(8), August 1988.

Rather than providing a complete class library for object concurrency, it has also been proposed to add a discrete "tasking package" to an existing class library (Doeppner, et al.)[6]. In the Doeppner model, the tasking package consists of four C++ classes to be used by the programmer as base classes to build their own classes for parallel computations. The first of these is the task class, and the constructors of any class derived from this task class run as a separate thread control in the program. The package also includes a second class, called monitor, which defines a set of routines to make a derived thread act as a monitor for the controlled sharing of the data between different tasks. Two additional classes, QHEAD and QTAIL, define a one way queue for communication between tasks.

[6]T. W. Doeppner Jr. and A. J. Gable, "C++ on a Parallel Machine", CS-87-26, Brown University Department of Computer Science, November 1987.

Other proposals for specific abstract "task like" classes are found for directed purposes, as in U.S. Pat. No. 5,142,674—Barker et al, relating to the use of an abstract class in an object-oriented document or local library for constructing application dependent indices to an object-oriented document database for random object retrieval.

In class libraries, such as Doeppner, which implement an "active object" abstraction, it is the job of the task constructor to spin off an independent thread of control for instances of any class for which the task class is a base class.

Every time such an object is created, a series of constructors are invoked, one of them being the constructor for the task class. In normal executions of constructor invocation in C++, once space for a newly allocated object is reserved on the heap, its constructor is called. This will be the constructor defined (if one is defined) for the deepest level of inheritance. Because C++ specifies that these class constructors be executed before derived class constructors are executed, this deepest level of inheritance will immediately call the constructor for its base class (at the second deepest level of inheritance) before execution. The called base class will in turn immediately call its own base constructor, and so on. Finally, the constructor for the task class will be called (assuming that the task class has been used as the base class). Once the task constructor finishes and returns, the constructor that called it will perform its construction duties (which may involve calling constructors from member objects), and will then return to the constructor that called it. This continues until the first constructor is allowed to do its construction. This process is referred to as the invocation chain.

When the constructor for the task class is called, it generates a new thread of control, then directs the original thread to jump to the point in the program (called the originating call point) which immediately follows the invocation of the constructors, while the other thread continues executing the constructors. Typically in such libraries, the program makes the constructor for the derived class an infinite or semi-infinite loop, thus allowing the constructor thread to become an independent "activity" for the object.

In none of these prior applications for affecting concurrent processing is any provision made for message passing in the guise of C++ method invocation. Generally, communication happens solely with the use of shared variables and explicit message queues.

The reason for this is that C++ provides no native mechanism for selectively controlling which methods (or member functions) of an object are invocable.

SUMMARY OF THE INVENTION

It is therefore an object of the present invention to provide a mechanism in an unextended object-oriented language such as C++, permitting selective acceptance of messages passed between objects and delaying acceptance of other messages for later acceptance, for use in connection with a standard non-extended compiler.

It is also an object of the present invention to provide a method for implementing concurrent processing control through method invocation.

It is a further object of this invention to avoid premature method invocation or object destruction in the processing of concurrent classes or multiple tasks in an object-oriented computing environment.

Accordingly, in one aspect, the present invention is directed to providing a mechanism for implementing non-sequential virtual function invocation in a object-oriented computing environment having a non-extended compiler, dynamic memory storage for constructing object classes, a class library storage containing function execution data, a virtual function table located in the class library storage having pointers to function implementation data for implementing virtual functions in a program, and first linkage means for indexing an object having virtual functions constructed in the dynamic storage with the virtual function table. The mechanism comprises an interface adapted to selectively delay indexing of virtual functions from the object constructed in the dynamic storage with the virtual function table, and second linkage means for indexing the object having virtual functions with the virtual function table through the interface.

Preferably, the interface is a protocol function table having pointers to function execution data in the class library for selecting virtual functions to delay access to the virtual function table, and the second linkage means replaces the first linkage means with an indexing link to the protocol function table.

In another aspect, the present invention is directed to a class library adapted for use in an object-oriented computing environment. The library includes virtual function execution data for executing virtual functions declared in class objects from the library. The library also includes a virtual function table pointing to the virtual function data for access from class objects from the library, and an interface, preferably a protocol function table, adapted to be linked between the virtual function table and class objects from the library. The interface has means for delaying access from class objects to the virtual function execution data in the library.

In a further aspect, the present invention provides, in a compiled object-oriented language operating system having an operating program, a dynamic memory stack for allocation of activation records and at least one activation record for said operating program allocated on the stack, a stack pointer located on the stack pointing to an originating call point in said at least one activation record, dynamic memory storage for constructing object classes from a class hierarchy, a class library storage containing function execution data, a virtual function table located in said class library storage having pointers to function execution data for executing virtual functions in a program, and first linkage means for indexing a data object in the class hierarchy having virtual functions constructed in said dynamic memory storage with said virtual function table, a mechanism for creating concurrent processing threads. The mechanism comprises a first base class in the class hierarchy adapted for constructing a concurrent thread of control in the operating program as a virtual function and adapted for indexing through the first linkage means to the virtual function table when constructed in the dynamic memory storage, means for storing an index to said at least one activation record in the data object on allocation of the data object in the dynamic memory storage, means for accessing the index on construction of the first base class in the dynamic memory storage, an interface adapted to delay complete construction of the concurrent thread of control in the operating program from the first base class constructed in the dynamic memory storage, and second linkage means for indexing the first base class with the virtual function table through the interface.

The present invention also provides a method for controlling method invocation sequence in a object-oriented computing environment in which there is a non-extended compiler, dynamic memory storage, a class library storage containing function execution data for class objects, a virtual function table pointing to said function execution data and linkage means for indexing an object having virtual functions constructed in said dynamic storage with the virtual function table. the method comprises the computer implemented steps of constructing a class object having virtual functions from the library in the dynamic memory storage, creating a first register in the class object indexing the virtual functions in the class object to the virtual function table, creating an interface protocol table for selectively delaying execution of virtual functions invoked through the class object, replacing the first register with a second register in the class object indexing the virtual functions in the class object to the protocol function table, and and indexing the protocol function table to the virtual function table.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

According to the present invention, in the case of sequential object-oriented languages such as C++, correct execution of methods invoked non-sequentially can be accomplished through transforming otherwise sequential classes in the class hierarchy to concurrent ornon-sequential classes.

To create non-sequential classes, the present invention provides an interface with a known mechanism, the virtual function table.

Although run-time method linking simplifies object-oriented programming and optimizes compile time, the requirement to search through multiple classes in a hierarchy to determine all of the parameters of the invoked method adds to run-time, and is not desirable in efficient object-oriented languages such as C++.

Figure 1:
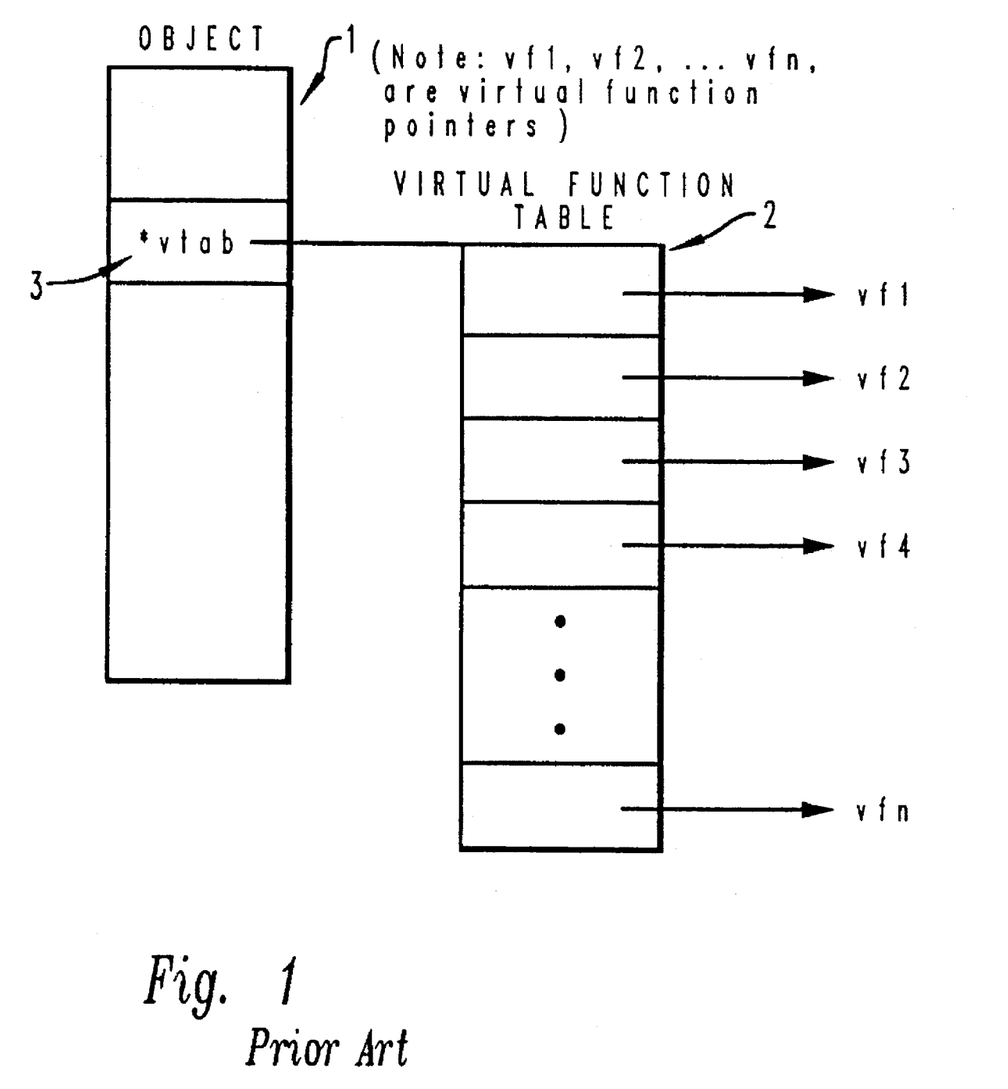
FIG. 1 is a schematic representation of the index linkage between the heap allocation of an object in C++ having virtual functions and a corresponding virtual function table for the class hierarchy.

To rapidly traverse the class hierarchy during method invocation at run-time in C++, a virtual function table 2 as shown in FIG. 1 is accessible from the object 1 constructed on the heap. The virtual function table 2 lists all virtual (inherited) functions in the order defined in the class hierarchy, and is accessed or linked through storage of a "vtab" pointer 3 in a register in the object's heap allocation 1. Reference to the virtual function table through the vtab pointer establishes the exact ranking of the invoked method in all classes in the hierarchy and the virtual function (vf1 through vfn) points directly to the correct location in each class of the hierarchy, in order to reduce run-time in locating all of the parameters defining the method for the object called.

Figure 2:
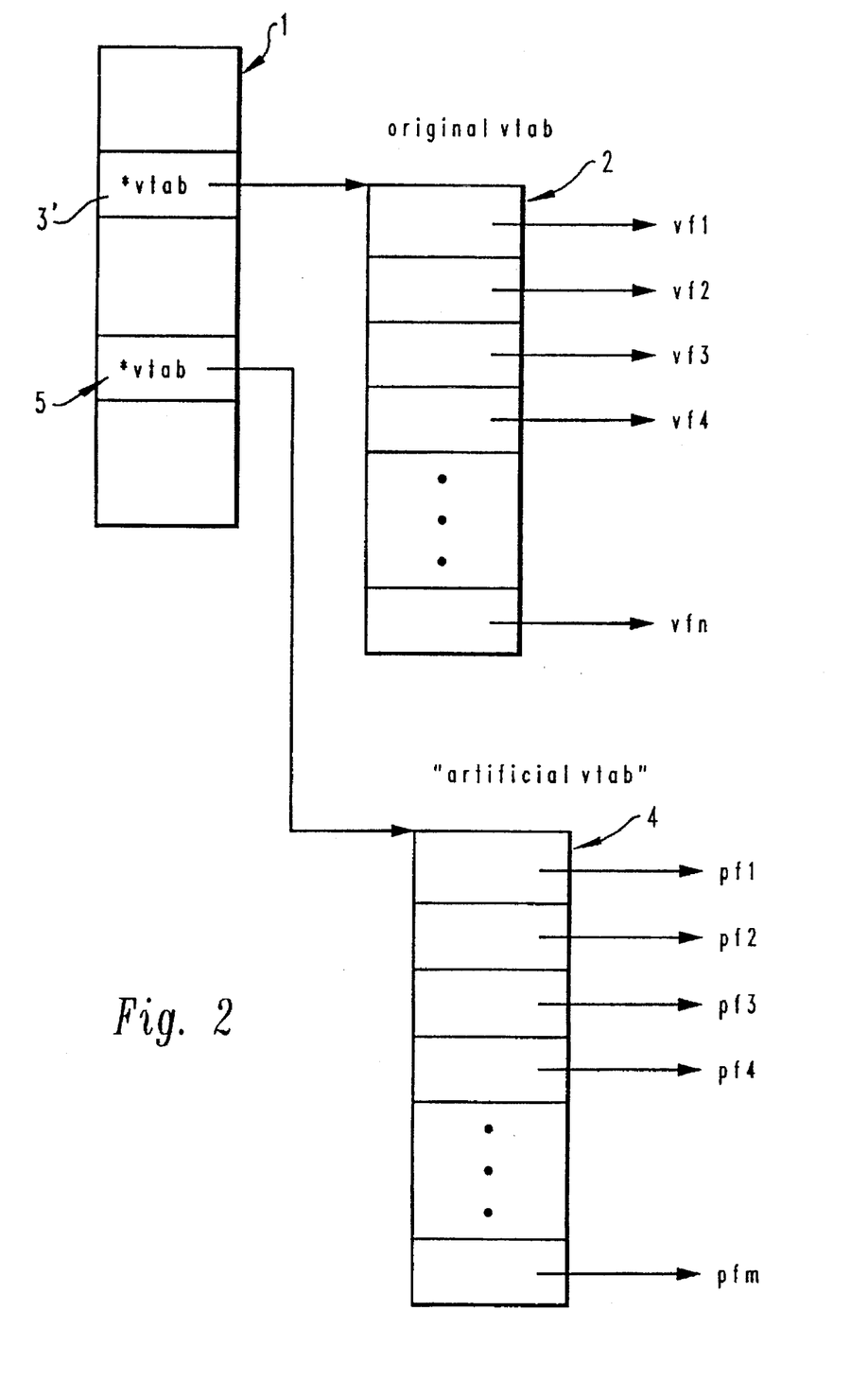
FIG. 2 is a schematic representation of index linkage, similar to that depicted in FIG. 1, following substitution of a protocol function table interface between the object and the virtual function table, according to the invention.

As shown in FIG. 2, implementation of the current invention involves the establishment of a subsidiary or "protocol" virtual function table 4 containing a table of generic protocol functions that are universal for all executions.

In addition, the vtab pointer 3 (from FIG. 1) for the virtual function table 2 is stored as a variable 3' (in FIG. 2) in a private area of the object on the heap 1, and is not directly accessible on method invocation. It is replaced by a new vtab pointer 5 that points to the the protocol virtual function table 4, and the virtual function pointers (vf1 through vfn) are indexed to the protocol virtual function table 4.

In a preferred embodiment of the present invention, the protocol virtual function table is implemented through a base class (task class) in a class library. Whenever an object of a subclass derived from the task class has a method declared as virtual, particularly a method invocable from another object, the protocol mechanism from the library will replace the vtab pointer 3 for that object with the new protocol vtab pointer 5 pointing to the protocol virtual function table 4.

Each protocol function (pf1 through pfn) in the protocol virtual function table 4 is defined so that it will, on completion of its protocol function, invoke the correct virtual function. Thus, pf1 will invoke vf1, pf2 will invoke vf2, and so on. The protocol function pointers can either be indexed directly to their corresponding virtual function pointers, or indirectly through the vtab pointer 3 stored in the object.

Protocol functions can be used for selectively delaying acceptance for execution through the virtual function pointers of certain messages, until a specified event has occurred. Examples of this would include:

1. delaying premature method invocation during object construction;

2. executing a waiting protocol function to ensure completion of the thread's operation to avoid premature object destruction;

3. re-directing a thread of control to a remote processor for executing a remote procedure call (this is described in detail in concurrently Canadian patent application titled "Accessing Remote Data Objects in a Distributed Memory Environment"—docket number CA993-009, the disclosure of which is incorporated herein by reference); and 4. in creating concurrency, a) delaying starting a new thread of control pending implementation of certain tasks such as locating the original calling point in the operating program to return the original thread of control following implementation of the concurrent object, and b) conversely, delaying directing the thread of the parent object to the originating call point on the stack until the new object has been fully constructed, to avoid method invocation in the new object until its construction is complete.

In connection with creating object concurrency, the task class defines the invocable method for creating a new thread of control which, according to the preferred embodiment, is declared as a virtual function. The invocation of the concurrency method activates the protocol function mechanism by copying the vtab pointer 3 into an instance variable of the task class and replacing the original vtab pointer 3 with a new protocol vtab pointer 5 stored in a register in the object's heap allocation 1 pointing to the table of protocol functions located in the class library for the task class.

However, spinning off a new thread of control is delayed pending completion of the new object's construction. Once the task class constructor returns, construction by other constructors in the class hierarchy continues until control is given to the constructor for the object originally called from the operating program. Upon completion of object construction, the first protocol function invoked spins off the thread for the newly created object, and the original thread is permitted to return to the original calling point in the operating program.

Figure 3:
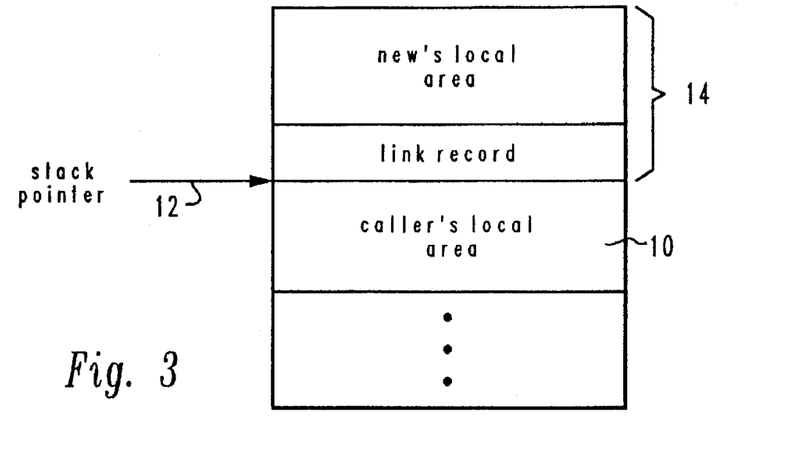
FIG. 3 is a schematic representation of a portion of dynamic stack memory on allocation of additional activation records at the start of construction of a hierarchical class, according to a further aspect of the invention.
Figure 4:
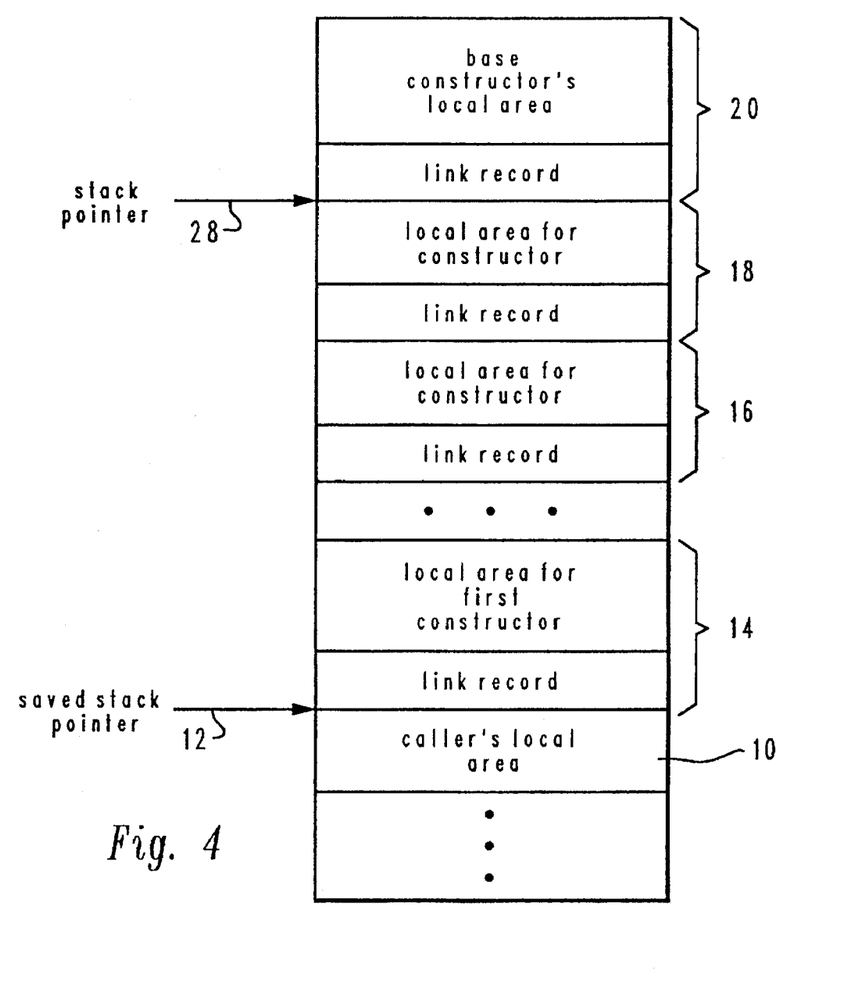
FIG. 4 is a schematic representation similar to FIG. 3 of allocation of activation records following construction of a base constructor in the class hierarchy.

A mechanism for locating the originating call point on the stack for a calling program from a base class constructed on the heap from a class hierarchy is described in detail in my concurrently filed application titled "Linkage for Accessing Data Objects in the Stack" (docket number CA9-93-008— the contents of which are incorporated herein by reference), and is illustrated in FIGS. 3 and 4 herein. This technique can be combined with the present invention in a single linkage mechanism to provide a simple and direct method for replacing the vtabs, according to the present invention, as described hereafter.

The combined linkage mechanism provides an elegant and automatic means for effecting concurrency that is portable to a wide variety of processing systems. In some operating systems, the task constructor could simply store a pointer to a global automatic start routine for accessing the protocol function mechanism alone or the combined linkage mechanism.

In effecting concurrency, a problem arises when the task constructor executes in an invocation chain where the number of levels of inheritance and which levels define constructors is unknown. As discussed in my concurrently filed application (document number CA993-008), the task (base) constructor does not know where to look for the address of the originating point in the program.

This can be solved by saving an index or variable, such as the stack pointer or the return address for the original program in the data object at the time of its heap allocation, that is, at the time the calling/operating program's activation record on the stack calls the object's constructor and the first activation record for the object is allocated on the stack (FIG. 3). Then, by the time the constructor for the base constructor is called and numerous activation records for each of the intervening classes in the hierarchy have been constructed on the stack (as shown under brackets 14, 16, 18 and 20 in FIG. 4), the task constructor will be able to directly locate the original stack pointer location through the indexed variable stored in the object's heap allocation and return the original thread of control there after creation of the concurrent thread.

In the present implementation, in addition to storage of the original stack pointer value into an instance variable in the task class activation record on the stack, invocation of the task constructor also copies the address of the object under construction into the link record pointed to by the original stack pointer value. This record establishes when the new object's constructor has been called and the new object has been fully constructed.

Thus, the protocol function table in the present invention ensures optimal timing in delaying the spinning off of the new thread of control and returning the parent (original) thread to the originating call point on the stack until both the new object has been created and the originating call point located.

Figure 5:
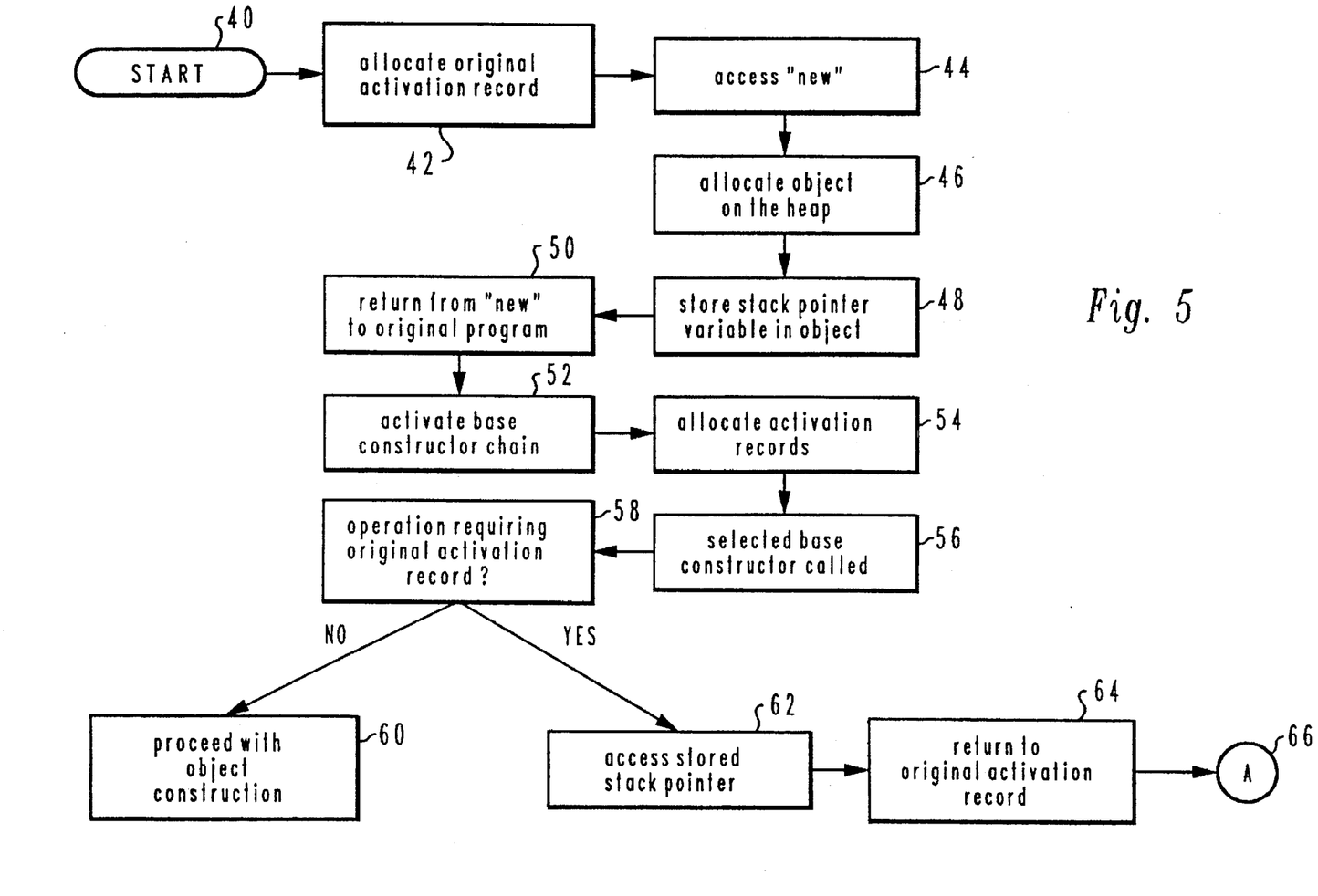
FIGS. 5 and 6 are a flow diagram illustrating the computer implemented steps in executing concurrency, according to one aspect of the invention.
Figure 6:
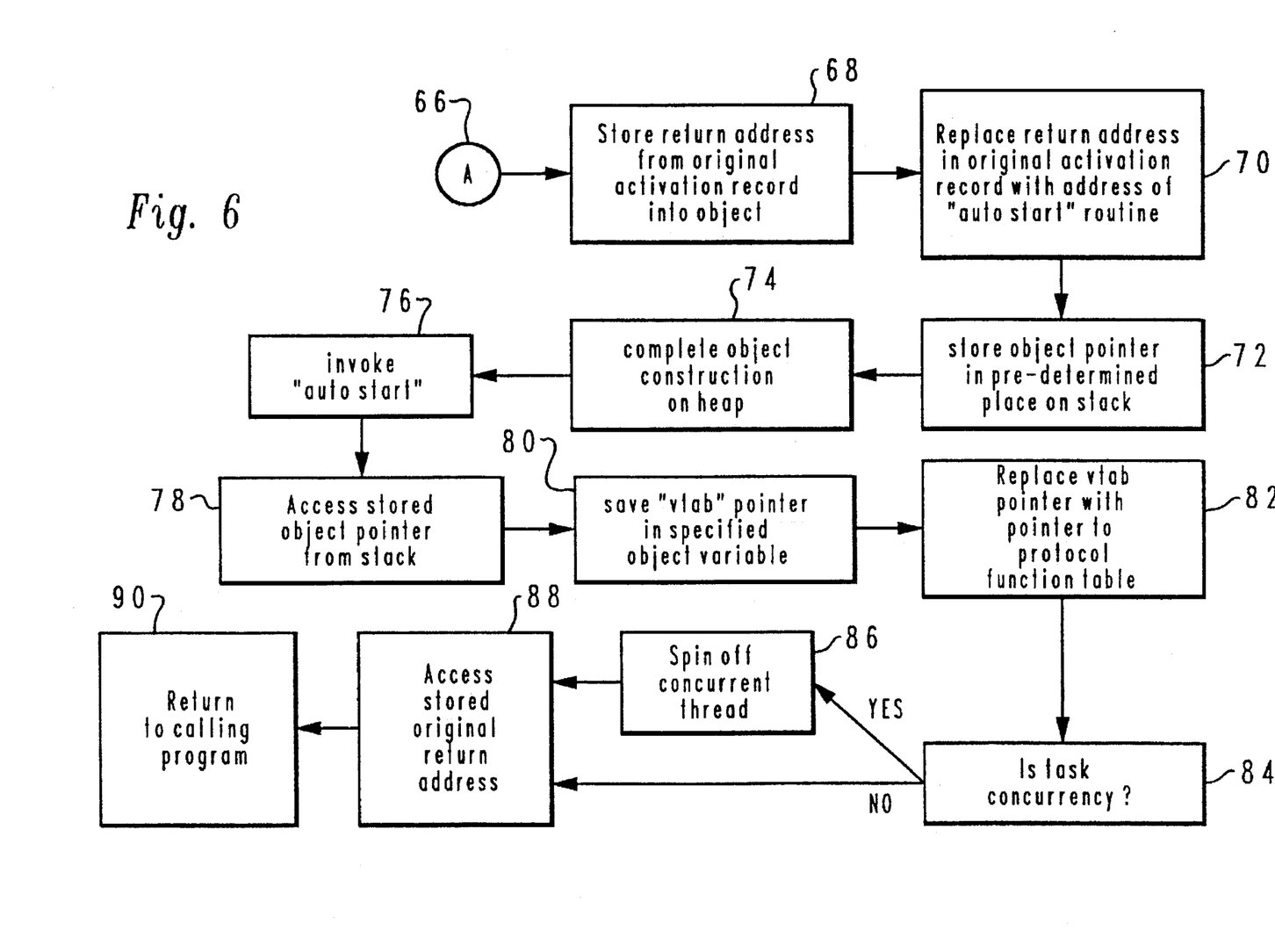

FIGS. 5 and 6 provide an outline of the foregoing steps in a flow diagram.

In FIG. 5, the start of an operating program (block 40) results in the allocation on the stack of an activation record for that program 42. Normally, the program's call to a data object from a class hierarchy would result in allocation for constructing the data object on the heap, but pursuant to a preferred embodiment of the invention illustrated in these Figures, the object's heap allocation is designated as an "active" object through accessing an overloaded "new" operation in the task base class 44, before allocation of the data object on the heap 46. The "new" operation causes the stack pointer from the original activation record to be stored in the data object heap allocation 48. On return to the original program from "new" 50, the invocation chain is activated 52, and activation records are allocated on the stack for the "active" object of class construction on the heap 54. When the selected base constructor is called 56, if it contains no operation (such as concurrency) requiring return to the original activation record, object construction on the heap is simply completed (blocks 58 and 60). However, if a concurrency task is to be executed, then the stored stack pointer is accessed as a means of locating the original activation record (blocks 58, 62 and 64).

FIG. 6 is a continuation of the FIG. 5 flow diagram. As shown in FIG. 6, the return to the original activation record permits access to the return address for the original activation record which is stored in the data object heap allocation 68. In the present implementation, the return address in the original activation record is replaced with the address of an "auto start" operation 70, then the object pointer is stored in a pre-determined place in the stack 72 and object construction on the heap is completed 74.

The "auto start" executes several actions 76, including accessing the stored object pointer from the stack 78, saving the vtab pointer 80 and replacing it with a pointer to the protocol function table 82.

Where the task is concurrency, in this embodiment, a separate thread is spun off as a protocol function 86 and the stored original return address accessed 88 to return to the original program 90. Where the task is not concurrency, the calling program can be accessed directly through the stored original return address (blocks 88 and 90). Another use for the delay function of protocol functions is as a method to delay future invocations of itself or other methods in its object, in order to prevent concurrency within an object in a concurrent processing environment. One example of this type of application would be with buffers that operate on "put" (to put data items in the buffer) and "get" (to take data items from the buffer). Where the buffer is full, the protocol interface of the present invention would delay passing further method invocations into the buffer, and where the buffer is empty, the interface would delay the "get" method. The "put" method would then cancel the delay on the "get".

A second example of the use of protocol functions to prevent concurrency within an object would be to replace the monitor class from the Doeppner example described above, providing in lieu, a method invocation delay operation when when an object's method has been invoked and is executing under a different call or thread.

Protocol functions can be used to solve other problems as well. They can ensure that the thread of an active object has been started before permitting invocation of its methods, and when the protocol function finds that the thread is not running, it can start it. In this type of implementation, it would actually be unnecessary or optional to include a separate routine for starting concurrent threads, and it would also not be necessary to implement the stack storage process described in my concurrently filed application entitled "Linkage for Accessing Data Objects in the Stack" (docket number CA9-93-008), since the protocol function spinning off the new thread of control would have direct access to the object on the stack invoking the new object's method(s).

While the invention has been particularly shown and described with reference to a preferred embodiment, it will be understood by those skilled in the art that various changes in form and detail may be made therein without departing from the spirit and scope of the invention.

I claim:

1. A method for providing concurrent execution capability to an object-oriented computer program compiled under a non-extended compiler, said object-oriented computer program is to be executed in a multi-threaded computing environment, wherein said method comprising the steps of:

constructing a class object having virtual functions from a class library within said object-oriented computer program in a dynamic memory storage;

generating a virtual function table pointer in a first location within said class object, wherein said virtual function table pointer is indexing virtual functions of said class object to a virtual function table;

copying said virtual function table pointer to a second location within said class object;

replacing said virtual function table pointer in said first location within said class object with a protocol function table pointer, wherein said protocol function table pointer is indexing said virtual functions in said class object to a protocol function table for selectively delaying execution of virtual functions invoked through said class object; and compiling said object-oriented computer program utilizing a non-extended compiler such that concurrent execution capability of said object-oriented computer program can be enabled in said multi-threaded computing environment.

2. The method according to claim 1, further comprising the step of storing said virtual function table as a variable in said class object.

3. A memory for providing concurrent execution capability to an object-oriented computer program compiled under a non-extended compiler, wherein said memory comprising:

means for constructing a class object having virtual functions from a class library within said object-oriented computer program in a dynamic memory storage;

means for generating a virtual function table pointer in a first location within said class object, wherein said virtual function table pointer is indexing virtual functions of said class object to a virtual function table;

means for copying said virtual function table pointer to a second location within said class object;

means for replacing said virtual function table pointer in said first location within said class object with a protocol function table pointer, wherein said protocol function table pointer is indexing said virtual functions in said class object to a protocol function table, wherein said protocol function table comprises protocol functions for selectively delaying execution of virtual functions invoked through said class object; and means for compiling said object-oriented computer program utilizing a non-extended compiler such that concurrent execution capability of said object-oriented computer program can be enabled in said multi-threaded computing environment.

4. The memory according to claim 3, further comprising the means for storing said virtual function table as a variable in said class object.

* * * * *